Hobart et al.

[11] 3,720,213
[45] March 13, 1973

[54] LASER PHOTOCOAGULATOR

[75] Inventors: James L. Hobart, Palo Alto; Steven M. Jarrett, Los Altos, Calif.

[73] Assignee: Coherent Radiation, Palo Alto, Calif.

[22] Filed: Feb. 5, 1971

[21] Appl. No.: 113,026

[52] U.S. Cl. ............... 128/395, 128/303.1, 331/94.5
[51] Int. Cl. ................................................. A61n 5/06
[58] Field of Search .................. 128/395–398, 362, 128/303.1; 331/94.5

[56] References Cited

UNITED STATES PATENTS

| | | | |
|---|---|---|---|
| 3,642,007 | 2/1972 | Roberts et al. | 128/395 |
| 3,659,613 | 5/1972 | Bredemeier | 128/395 |
| 3,096,767 | 7/1963 | Gresser et al. | 128/395 |
| 3,348,547 | 10/1967 | Kavanagh | 128/395 |
| 3,467,099 | 9/1969 | Lotmar | 128/303.1 |
| 3,487,835 | 1/1970 | Koester et al. | 128/303.1 |
| 3,617,927 | 11/1971 | Pohl | 331/94.5 |
| 3,456,651 | 7/1969 | Smart | 128/303.1 |
| 3,315,680 | 4/1967 | Silbertrust | 128/395 |
| 3,417,754 | 12/1968 | Smart | 128/395 |
| 3,467,098 | 9/1969 | Ayres | 128/303.1 |

OTHER PUBLICATIONS

Yahr, W. Z., et al., "Journ. of Assoc. for Advancement of Med. Instrumentation," Sept./Oct., 1966, pp. 28–31

*Primary Examiner*—Kyle L. Howell
*Attorney*—Limbach, Limbach & Sutton

[57] ABSTRACT

A laser photocoagulator for treating a patient's eye comprises a laser, optical means for delivering the output beam from the laser to the desired location in the eye of the patient, and wherein the laser is operated to provide a multi-mode output beam. The use of the multi-mode output laser beam enables the treatment of certain eye diseases while insuring that damage to the cornea and other parts of the eye resulting from the passage of the laser beam is prevented.

8 Claims, 5 Drawing Figures

INVENTORS
JAMES L. HOBART
STEVEN M. JARRETT

ATTORNEYS

LASER PHOTOCOAGULATOR

BACKGROUND OF THE INVENTION

This invention relates to a laser photocoagulator and more specifically relates to an improved laser photocoagulator for treating disorders of the human eye.

Pioneering work in the early 1950's led to the first use of photocoagulation in the treatment of certain problems of the eye. Instruments using incoherent light, primarily Xenon-arc discharges, were developed and have been used with some success. The development of the laser in 1960 made it possible to consider laser light sources instead of incoherent sources. The laser offered the advantages of higher power, smaller focus spot size and better absorption in the eye. One use of laser photocoagulation is in treating retinal detachments in the human eye by fusing the retina of the eye to the cohoroid. Laser photocoagulation is used to destroy tumors, to prevent the spread of disease and in many other ways known to the medical profession.

Since photocoagulation destroys the eye tissue in the area being coagulated an effective coagulation apparatus must focus the intense energy only upon a carefully sized and selected portion of the eye which is to be treated.

For example, in treating the macula portion of the eye, it is imperative that extremely small spot sizes be utilized in order to prevent inadvertant destruction of the fovea. The fovea is located within the macula and is substantially responsible for the reading function performed by the eye. In order to insure the safety of the fovea, spot sizes in the ranges, for example, of 40 to 50 microns are required.

It can be shown that using a photocoagulator with a laser operating in the usual fundamental or $TEM_{00}$ mode, the spot size on the retina is given approximately by the relationship 1. Spot size $\cong 2 F \cdot \lambda$ where $F$ is the focal ratio of the eye lens and $\lambda$ is the wave length of the laser beam.

This also assumes that a Goldman type contact lens is used to neutralize the refraction effect of the eye's cornea and lens. The focal ratio $F$ is given by 2. $F = fL/D$ where $fL$ is the focal length of the eye, and $D$ is the diameter of the circular area of the lens which is illuminated by the beam.

Equation (2) may also be expressed as

3. $D = fL/F$

In such applications as described above where, for example, a 50 micron spot size is desired, the diameter $A$ of the laser beam can be calculated easily. It is first necessary to calculate $F$ which can be found by rearranging equation (1), and where $\lambda$ for an argon laser output is approximately 0.5 microns:

4. $F =$ Spot size$/2\lambda = 50$ microns$/2.5$ microns $= 50$

And therefore, substituting F in equation (3), and where $fL$ is equal to approximately 1.7 cm in the ordinary eye:

$$D = fL/F = 1.7 \text{ cm}/50 = 0.340 \text{ mm}$$

Unfortunately, a laser beam providing a 40 or 50 micron spot having sufficient powers to be useful to cause coagulation can damage the cornea where the diameter of the beam at the point where it passes through the cornea is 0.340 mm as calculated above. This damage is caused because the energy density at the cornea is too great.

In particular, slight burning of the cornea due to absorption by the cornea itself, opacities in the cornea or particles on the surface, sometimes results. This problem was not discovered at an earlier date because earlier laser photocoagulators did not have as much laser power available, and consequently, although the problem was inherent, it was not realized. A second problem caused by the high energy density both through the cornea and through the ocular media of the eye is called thermal-defocusing or blooming. Thermal-blooming results in larger spot sizes than desired on the retina. Thermal-blooming is caused by changes in the refractive index of the lens of the eye and other parts of the eye due to heating thereof. Heating of the cornea and lens results in a small change in the index of refraction in the cornea and lens and produce a thermal lens effect. This effect then causes the beam to be defocused resulting in a spot size on the retina which may be 3 to 5 times larger than would occur without thermal-blooming. As a result the energy density at the retina may be insufficient to cause coagulation. The problem is particularly acute in older patients where there is more absorption in the cornea and lens.

In order to reduce the energy density through the cornea and ocular portions of the eye without reducing the energy imparted at the point of treatment, the solution is to increase the area of the beam at the point it passes through the cornea. Thus instead of the 0.340mm diameter beam in the case calculated above, a 1.0 mm diameter beam would, for example, permit a beam having lower, safer, energy density through the eye. In fact since the energy density is a function of the area of the beam, and since the area of the beam is a function of the square of the diameter of the beam, the above increase in $D$ of 3 to 1 would result in an energy density reduction of 9:1. And, since as a practical mater, it is often difficult to achieve a value of $D$ as small as 0.340 mm as calculated above, providing a 1.0 mm diameter beam to the cornea would achieve a reduction in the energy density through the cornea of greater than 9:1.

If one substitutes a value of 1.0 mm for $D$ in the above equations, however, it will be found that the resulting spot size is only 17 microns. This is significantly smaller than the 40 to 50 micron spot size that was the original objective.

To provide a larger spot size while maintaining a sufficiently larger value of $D$, the common method of increasing the spot size to a size which can safely be administered to the eye has been to introduce an optical system for focusing the beam from the laser to a point beyond the surface of the retina being treated. This means that the size of the beam at the retina is larger than the spot size at the focal point of the beam. Unfortunately, this procedure has several serious drawbacks for the smaller spot sizes.

A main problem resulting from this approach is that when focusing in the vitreous, to treat a blood vessel, for example the focal point of the laser beam extends past the vessel onto the retina. With a larger value of $D$, the depth of field of the beam decreases and consequently those regions upon which the beam is focused as the retina above are susceptible to damage caused by the high intensity small spot size.

Several avenues were explored to solve these problems. In each case the purpose was to decrease the energy density through the cornea while maintaining the same spot size on the retina. An obvious solution would be to alter the optics used to bring the laser beam from the laser to the eye to be treated. This solution is not practical because the physical constraints inherent in the divergence of the laser beam and the focal length of the viewing and illuminating systems and the optical constraints of the eye itself. Other solutions which were explored include the use of holographic techniques to reconstruct an image of the desired size on the retina and a fiber optic technique to create an image of the desired spot size which could then be reimaged on the retina. None of these solutions proved feasible however.

SUMMARY OF THE INVENTION

It is therefore an object of the present invention to provide an improved laser photocoagulator.

Another object of the invention is to provide a laser photocoagulator with a laser arranged to operate to provide a multi-order output beam therefrom.

Another object of the invention is to provide a laser photocoagulator which can be used to provide small spot sizes on that portion of the eye being treated which does not result in damage to the cornea and lens of the eye.

Another object of the invention is to provide an improved laser photocoagulator in which the output beam to the eye is of a sufficiently low energy density so that thermal-blooming does not occur to enlarge the spot size.

Another object of the invention is to provide a method for treating certain eye diseases not otherwise treatable with other laser photocoagulator systems.

In accordance with the invention the above-mentioned problems are eliminated by changing the properties of the laser beam in such a way to achieve the desired larger spot size on the cornea for a given spot size on the retina. The latter is accomplished by providing an output beam having a higher beam divergence than that provided by a laser operated in the normal fashion.

In particular, the laser is modified to operate in a higher or multi-order transverse or spatial mode which results in an output beam angle of divergence approximately 2.3 times that of the normal, or fundamental, lowest-order transverse mode ($TEM_{00}$).

In order to convey the altered laser beam to the eye, appropriate optics must be employed in the photocoagulator system. The selection of these optics involve the use of techniques familiar to those skilled in the design of laser optical systems.

DESCRIPTION OF THE PREFERRED EMBODIMENTS

Figure 1:
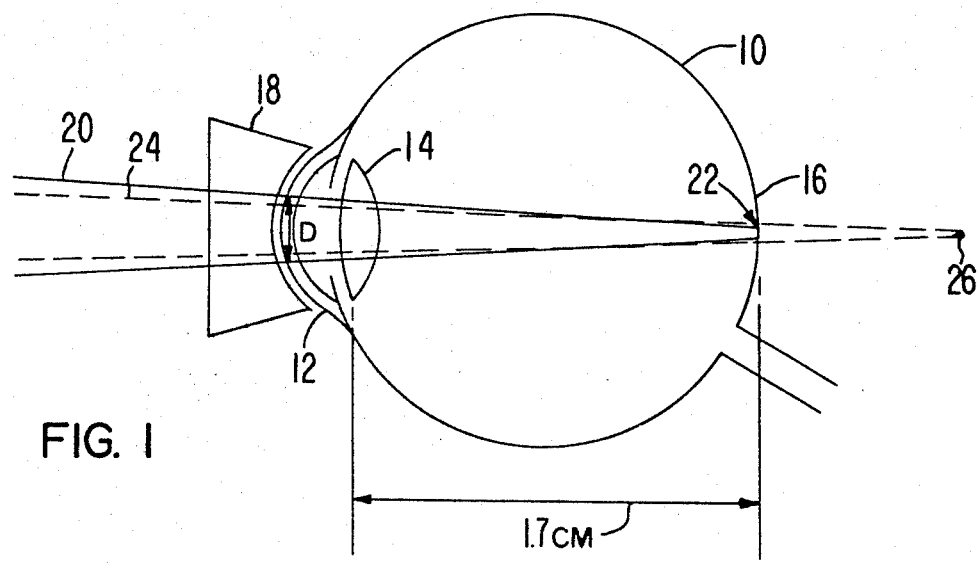
FIG. 1 is an enlarged cross-sectional view of a human eye.

The difficulties of prior art laser photocoagulators using a laser in its normal fundamental mode operation can best be seen by reference to FIG. 1 showing a human eye 10 including a cornea 12, and lens 14 and a retina 16. As is standard practice, a Goldman corneal contact lens 18 is placed on the cornea 12. The contact lens 18 eliminates the refractive effects of the cornea 12 and the lens 14 and thereby provides an effective refractive index through the eye of approximately one.

As can be seen in FIG. 1 the focal length of a typical eye is 1.7 centimeters. When, as explained above, a 40 to 50 micron beam size is required, as for example to treat areas of the macula, a fundamental order laser beam 20 typically creates a spot size 22 of about 17 microns on the retina 16, for a beam having a sufficiently large value of $D$ (for example, 1.0 mm) as it passes through the lens 14 that neither burning of the cornea or thermal-blooming occurs. By providing an additional lens (not shown), the usual practice is to provide a beam 24 which has a focal point 26 beyond the retina 16 of the eye. With the focal point at 26 the spot size 22 at the retina is increased to the desired size, typically a minimum of around 40 microns. As explained above, this results in undesirable difficulties.

In accordance with the present invention a laser beam is provided having a high order or multi-order mode. As will be explained in more detail subsequently, the geometry of a beam of a higher order mode is such that spot sizes as low as 40–50 microns are achievable wherein the energy at the point of treatment is sufficient to cause coagulation and at the same time the area of the beam through the lens is sufficiently large (i.e., large value of $D0$ that the energy density of the beam is low enough to insure safety to the cornea and also prevent thermal-blooming Referring now to FIG. 2, there is shown an overall view of a laser photocoagulator, such as the slit lamp photocoagulator described in copending patent application Ser. No. 41,505, entitled "Slit Lamp Photocoagulator," filed May 28, 1970, by Vassiliadis et al. A laser 30 is provided in a console 32 which also encloses a control box 34 and other necessary electronic equipment 36. In one embodiment laser 30 is a continuous wave argon laser, such as a Model 52A laser manufactured by Coherent Radiation of Palo Alto, California, the assignee of the present invention. Although other continuous wave lasers could be substituted in the present invention such as a Krypton laser or an argon/krypton laser, such as Coherent Radiation Model 52K and 52MG respectively, the argon laser has certain advantages. The high absorption of the argon laser blue-green wave length by the hemoglobin in the eye makes is possible to treat vascular diseases of the eye effectively. Also the high absorption of the argon laser wave length by the pigments in the eye and the high transmission by the ocular media make is possible to treat diseases with less power than that required by a Xenon-arc photocoagulator.

An argon laser has high stability which makes possible very accurate control of the dosage of each exposure. Further, as would be true of any continuous laser, the continuous wave nature of the argon laser allows exposures to be made and do not cause shock waves usually associated with, for example, pulsed ruby photocoagulators.

The output of the laser 30 is coupled through a shutter assembly 38, through an articulated arm 40 to a slit lamp 42. The shutter 38 is adapted to be moved into and out of the path of the laser beam by a rotary solenoid (not shown). The purpose of this shutter assembly 38 is to permit a very small fraction of the laser beam to be transmitted therethrough while the shutter is in the path of the laser beam. This small fraction of the laser beam acts as an accurate aiming beam in the instrument since it proceeds along the same path that the full beam will follow when the solenoid is actuated to the shutter assembly and is rotated out of the path of the laser beam. Thus the laser beam acts as its own aiming beam and the aiming beam can be seen impinging on the target site, say on the retina, for example. The ophthalmologist thus can seen exactly where the photocoagulation will take place. Further detailed explanations of this feature of the photocoagulator is described in the aforementioned patent application.

The shutter assembly 38 can be either automatically set for a predetermined length of time or can be manually operated by the operator. The laser beam is introduced into the optics of the slit lamp 42 in an accurately maintained directional position independent of slit lamp orientation. The slit lamp 42 is a standard type slit lamp such as, for example, that manufactured by Carl Zeiss, Inc. in West Germany, The slit lamp 42 comprises a binocular optical viewing arrangement, generally indicated by reference numeral 44 and a light source 46 for illuminating the eye under observation.

Figure 3:
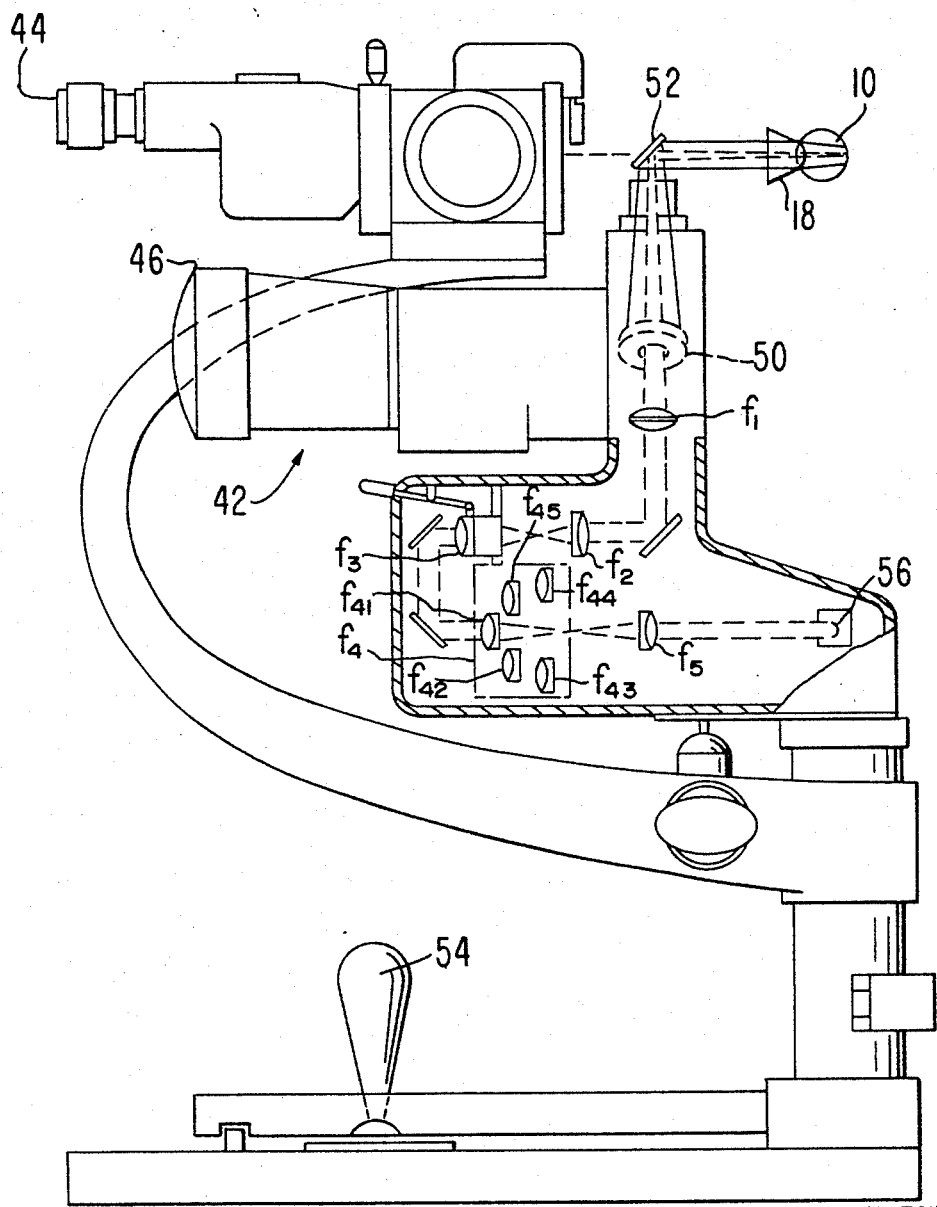
FIG. 3 is an elevational view, partially in section, of the delivery system of the photocoagulator system shown in FIG. 2.

Referring now to FIG. 3 there is shown a side view partially in section of the slit lamp 42. The slit lamp 42 permits magnetic binocular viewing of portions of a patients eye indicated by reference numeral 10.

Also a part of the standard slit lamp is the light source 46 which supplies light to a mirror 50 which reflects the light upward to a prism 52. The prism 52 reflects the illuminating light through the Goldman lens 18 onto the patient's eye 10. A standard slit lamp also includes a positional control lever 54 which may be used to adjust the orientation of the slit lamp.

The laser beam is coupled into the slit lamp from the articulated arm 40 through an opening 56. The beam goes through lens $f5$ and then through one of a plurality of lenses $f4$ forming a lens turret.

The lens wheel or turret $f4$ may contain any number of additional lenses such as, for example the five lenses $f41 - f45$. The lenses are mounted for rotation about an axis (not shown). In this manner, any of the lenses carried by the turret $f4$ may be moved into the path of the laser beam.

Each lens in the turret is specially designed and provides a specific size of beam focus at the same fixed position in space that is coincident with the focal plane of the binocular viewing optics of the slit lamp or beyond the focal plane or rear of the eye. In this way different size exposure sites can be obtained at the target site always coincident in space with the view of the ophthalmogist or operator. That is, the size of the exposure at the target can be varied without changing the focus.

Each of the individual lenses in the turret is designed such that for an incident nearly columinated beam of certain cross-section, a specific image size is formed at the focus. Through the use of these special lenses the laser beam is always coincident with the focus view of the ophthalmogist and yet different focus beam spot sizes are obtained.

Figure 2:
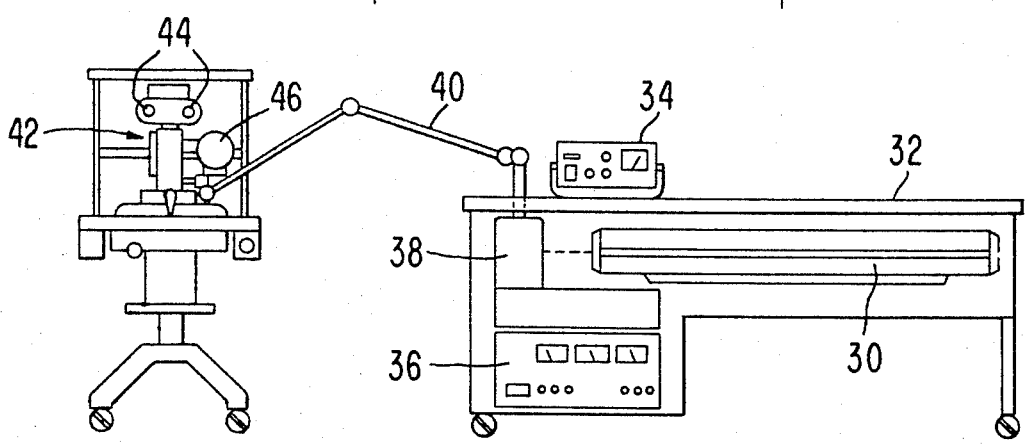
FIG. 2 is an elevational view of a laser photocoagulator system in accordance with the present invention.
Figure 4A:
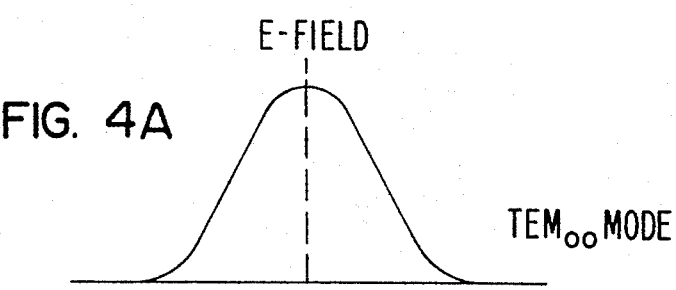
FIG. 4A is a cross-sectional representation of the energy distribution of a $TEM_{00}$ mode laser beam.

In accordance with the invention the laser 30 shown in FIG. 2 is constructed to operate in a higher mode operation. As explained above, the normal operation of a laser such as an argon ion laser is the fundamental or low order mode such as $TEM_{00}$. The $TEM_{00}$ mode is illustrated graphically in FIG. 4A showing the energy distribution of a laser beam operated in the $TEM_{00}$ mode. This mode provides the smallest beam size and hence a high energy density. This is normally a desirable mode for most applications using a laser. In fact, in constructing a gas laser, one normally attempts to operate the laser at the lowest mode possible.

Figure 4B:
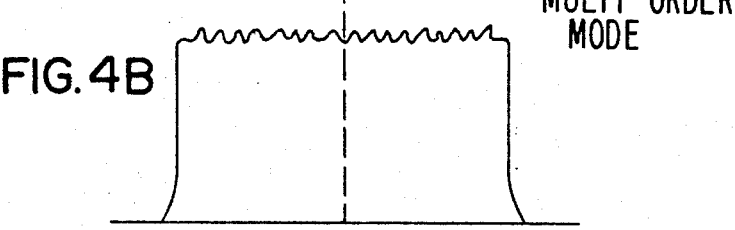
FIG. 4B is a cross-sectional representation of a multi-order, multi-mode laser beam.

The cross-section of energy distribution of a higher order, multi-order mode laser beam is shown in FIG. 4B. It can be seen that the energy density is more evenly distributed across the cross-section of the beam than in a case of the gaussian distribution of the $TEM_{00}$ mode of FIG. 4A.

The theory and specifics with respect to laser beam modes are described in much detail in a book entitled Gas Lasers by Arnold L. Bloom, published by John Willy and Sons, 1968. In particular Chapter 3 beginning at page 69, provides additional information about laser beam modes.

It can be shown mathematically that the mode structure of the laser beam effects the focus spot size for a given optical system such as the optical system of the eye, and in fact, it can be shown that a higher order mode wave front propagating this space will behave approximately the same as a propagating wave front of a fundamental mode beam with the exception that the beam waist has a cross-sectional diameter approximately 2.3 times those of a gaussian beam.

It was explained earlier that a beam 20 of a fundamental mode provides a spot size of approximately 17 microns where the beam diameter is increased to 1.0 mm and where defocusing is not used. Also explained was the fact that this size is too small to insure safe operation on the eye or to prevent thermal-blooming. With the multi-mode beam substituted for a fundamental mode beam, the spot size is approximately 2.3 times that for the fundamental mode beam. Thus, instead of a 17 micron spot size, a spot size of approximately 39 microns results, which is in the desired operating range. These same calculations can be performed for a variety of desired spot sizes, and each case the spot size is approximately 2.3 times that calculated for the guassian wave front.

Thus, operating the laser 30 in a higher order mode, it is possible to achieve a spot size on the retina or other part of the eye which is being treated which is approximately 2.3 times the size of that for a photocoagulator using a conventionally operated low mode beam. With a laser operated in the higher mode region it is possible therefore, to provide a spot size large enough to insure that no damage will occur to areas of the eye adjacent to those portions being treated while at the same time maintain a beam having a sufficiently large cross-sectional area as it passes through the cornea and lens to insure that no damage will occur thereto, and to maintain the energy density at a sufficiently low level that thermal-blooming will not occur.

An operational laser providing multi-mode output beams can be constructed easily by interchanging the reflectors constituting the optical resonator of the usual laser with a set of reflectors which promote higher mode oscillation rather than low order mode oscillation. For example, the mirrors used in the resonators for normal mode operation of Coherent Radiation Model 52 argon laser comprise a five meter radius output coupler and a flat total reflector, comprising a long radius-flat type resonator. To provide a multi-mode output, the above reflectors are removed and 120 centimeter radius mirrors are substituted for both the total reflector and the output coupler thereby forming a near confocal type resonator. Further explanation of the types of resonators used in lasers can be found in the book cited above entitled Gas Lasers by Bloom beginning at page 74.

Details of the specific lens configuration used to deliver the multi-order mode laser beam to the eye are described in the following chart. The lenses referred to are shown generally in FIG. 3.

| Focal Length (in cm) | Distance between Lenses (in cm) |
|---|---|
| $f_1 = 12.5$ | $f_1$ to $f_2 = 13.2$ |
| $f_2 = 4.5$ | $f_2$ to $f_3 = 8.3$ |
| $f_3 = 3.8$ | $f_3$ to $f_4 = 28.4$ |
| $f_4 = 2.5$ | $f_{41}$ to $f_5 = 8.27$ |
| $f_{41} = 5.77$ | $f_{42}$ to $f_5 = 5.39$ |
| $f_{42} = 2.89$ | $f_{43}$ to $f_5 = 5.13$ |
| $f_{43} = 2.67$ | $f_{44}$ to $f_5 = 4.6$ |
| $f_{44} = 2.19$ | $f_{45}$ to $f_5 = 3.8$ |
| $f_{45} = 1.44$ | |

Since the use of a multi-mode beam enables one to have a desired spot size without high energy density light passing through the cornea and lens, burns to the cornea and lens are prevented and increases spot size due to thermal-blooming is obviated. Furthermore, there is no danger of damaging portions beyond the eye as in the case where the beam is modified so as to have a focal point behind the points of treatment in the eye.

Since the cross-sectional area of the beam in accordance with the present invention can be maintained at a large cross-sectional area, it is possible to increase the amount of optical power into the eye. At the same time the spot size is sufficiently large that it can safely be administered to the eye without damage thereto.

The use of a multi-order mode beam also has several other advantages. The ability to use larger power beams with multi-mode operation means that less power is required in the operation of the laser which insures a longer laser life. Another advantage is the multi-mode operation requires less sensitive alignment of the mirrors forming the optical resonator. This means that doctors and other physicians and technicians using the equipment, who are normally unskilled in laser technology, have less difficulty in maintaining the laser operation.

We claim:

1. Laser photocoagulator for treating a patient's eye comprising:
   a. a gaseous laser;
   b. optical means for delivering the output beam from said laser and focusing the same on a desired treatment location in the eye of the patient; and
   c. means for operating said gaseous laser to provide a high order transverse mode output beam.

2. Laser photocoagulator as in claim 1 wherein said laser includes an optical resonator assembly and wherein said operating means comprises a near confocal optical resonator.

3. Laser photocoagulator as in claim 1 wherein said laser comprises a continuous wave laser.

4. Laser photocoagulator as in claim 1 wherein said laser comprises an argon laser.

5. Laser photocoagulator as in claim 1 wherein said laser comprises an argon/krypton laser.

6. Laser photocoagulator as in claim 1 wherein said laser comprises a krypton laser.

7. Laser photocoagulator as in claim 1 wherein said operating means additionally provides a multi-order transverse mode output beam.

8. Laser photocoagulator for treating a patient's eye comprising:
   a. a gaseous laser;
   b. optical means for delivering the output beam from said gaseous laser to the eye of a patient; and
   c. means for providing a relatively small focused multi-transverse mode laser beam spot to the area of treatment within the eye, wherein the energy imparted at said area is sufficiently high to insure coagulation thereof, and wherein the energy density of the beam through the eye is sufficiently low to prevent damage to the eye and prevent thermal-blooming.

* * * * *